(12) United States Patent
Ban et al.

(10) Patent No.: US 8,326,460 B2
(45) Date of Patent: Dec. 4, 2012

(54) ROBOT SYSTEM COMPRISING VISUAL SENSOR

(75) Inventors: Kazunori Ban, Minamitsuru-gun (JP); Fumikazu Warashina, Minamitsuru-gun (JP); Makoto Yamada, Minamitsuru-gun (JP); Yuuta Namiki, Minamitsuru-gun (JP)

(73) Assignee: Fanuc Corporation, Minamitsuru-gun, Yamanashi (JP)

( * ) Notice: Subject to any disclaimer, the term of this patent is extended or adjusted under 35 U.S.C. 154(b) by 134 days.

(21) Appl. No.: 13/014,769

(22) Filed: Jan. 27, 2011

(65) Prior Publication Data

US 2011/0218675 A1    Sep. 8, 2011

(30) Foreign Application Priority Data

Mar. 5, 2010   (JP) .................................. 2010-049188
Apr. 12, 2010  (JP) .................................. 2010-091363

(51) Int. Cl.
*G05B 15/00* (2006.01)
*G05B 19/00* (2006.01)

(52) U.S. Cl. ............................. 700/259; 901/2; 901/47

(58) Field of Classification Search ............... 73/800; 318/568.19–568.23, 632; 414/1, 416.08, 414/735; 483/901; 700/245, 249, 250–259; 901/2–7, 10, 15, 16, 29–43, 46–49
See application file for complete search history.

(56) References Cited

U.S. PATENT DOCUMENTS

| 4,437,114 | A  | * | 3/1984  | LaRussa ............................ 348/94 |
| 5,255,096 | A  | * | 10/1993 | Boyle ............................... 348/95 |
| 5,319,443 | A  |   | 6/1994  | Watanabe et al. |
| 6,135,854 | A  | * | 10/2000 | Masumura et al. ................. 451/6 |
| 6,194,860 | B1 | * | 2/2001  | Seelinger et al. ................ 318/587 |
| 7,386,367 | B2 |   | 6/2008  | Watanabe et al. |
| 2003/0093183 | A1 | * | 5/2003 | Bunn et al. ...................... 700/259 |
| 2004/0081352 | A1 | * | 4/2004 | Ban et al. ....................... 382/154 |
| 2004/0086364 | A1 | * | 5/2004 | Watanabe et al. ........... 414/416.01 |
| 2004/0122552 | A1 | * | 6/2004 | Ban et al. ....................... 700/214 |
| 2004/0162639 | A1 | * | 8/2004 | Watanabe et al. .............. 700/259 |
| 2005/0166413 | A1 |   | 8/2005 | Crampton |
| 2007/0100501 | A1 | * | 5/2007 | Im et al. .......................... 700/259 |
| 2009/0005765 | A1 | * | 1/2009 | Oostman, Jr. et al. ............ 606/9 |
| 2010/0161125 | A1 | * | 6/2010 | Aoba et al. ...................... 700/254 |
| 2010/0274391 | A1 |   | 10/2010 | Dai |

FOREIGN PATENT DOCUMENTS

| EP | 0 812 662 A1 | 12/1997 |
| JP | 2889011 | 9/1993 |
| JP | 6-185984 | 7/1994 |
| JP | 11-248421 | 9/1999 |
| JP | 4174342 | 9/2004 |
| JP | 2008-183690 | 8/2008 |
| WO | 2008/047872 | 4/2008 |
| WO | 2009/077118 | 6/2009 |

\* cited by examiner

*Primary Examiner* — Khoi Tran
*Assistant Examiner* — Abby Lin
(74) *Attorney, Agent, or Firm* — Drinker Biddle & Reath LLP

(57) ABSTRACT

A robot system calculates positional information of a workpiece with respect to a visual sensor and calculates positional information of an arm tip at a second time based on first times stored by a storing section and the second time at which the visual sensor measures the workpiece.

4 Claims, 6 Drawing Sheets

ROBOT SYSTEM COMPRISING VISUAL SENSOR

RELATED APPLICATION DATA

This application claims priority under 35 U.S.C. §119 and/or §365 to Japanese Application Nos. 2010-091363, filed Apr. 12, 2010, and 2010-049188 filed Mar. 5, 2010, the entire contents of which are incorporated herein by reference.

BACKGROUND OF THE INVENTION

1. Field of the Invention

The present invention relates to a robot system that operates a robot by using positional information of a workpiece detected by a visual sensor.

2. Description of the Related Art

In order to perform operations such as handling and processing of a workpiece by using a robot, a position at which the workpiece is disposed and a grasping deviation of the workpiece grasped by the robot have to be accurately recognized. For this reason, in recent years, a visual sensor is used for visually recognizing the position of the workpiece and the grasping deviation of the workpiece.

When a camera is attached to a robot arm tip and the position of the workpiece disposed on a table and the like is measured, the position of the workpiece is recognized. In addition, when the position of the workpiece grasped by the robot is measured by a stationary camera, the grasping deviation is recognized.

In order to calculate the position of the workpiece when one of the camera or the workpiece is moved due to operation of the robot as described above, positional information of the robot at the moment of image capture is required. This is because even when the workpiece located at the same position is imaged, the position in the image is changed as the position of the robot to which the camera is attached or the robot grasping the workpiece is changed.

Japanese Patent No. 2889011 discloses a method for calculating a position of a workpiece in an image by using positional information of a robot at the time of image capture. However, when the technique disclosed in Japanese Patent No. 2889011 is actually applied, in order to obtain accurate positional information of the robot at the moment of image capture, the robot has to be temporarily stopped during image capture of the workpiece.

When the robot is temporarily stopped during image capture of the workpiece, there is a problem in that time increases because deceleration time, stop time for capturing the image and obtaining the robot position, reacceleration time and the like of the robot are required. In order to solve this problem, it is desired that the image of the workpiece be captured without stopping the robot and the robot position at the moment of image capture of the workpiece is obtained.

In this connection, a deviation between the time of image capture and the time of obtainment of the robot position may be a problem. For example, if the robot is moving at 2000 mm/sec and the time of image capture deviates from the time of obtainment of the robot position by 1 msec, the robot moves 2 mm between these times. Consequently, positional information of the workpiece included in the image of the workpiece causes an error due to the movement of the robot described above.

Further, assuming that a distance between the camera and the workpiece is 1 m, if posture of the robot varies by 0.1 degrees in 1 msec between the time of image capture and the time of obtainment of the robot position, a measurement error of 1000 mm×tan (0.1)=1.75 mm further occurs. Then, this measurement error is also included in the positional information of the workpiece.

Typically, a robot controller reads angular information of an encoder of a servo motor and the like at a regular cycle such as, for example, at a control cycle of the servo motor to recognize the positional information of the robot. Consequently, accuracy of the positional information of the workpiece measured by the visual sensor depends on this update cycle.

WO 2009/077118 A1 discloses a system for capturing an image of a workpiece during movement of a robot by a camera attached to the robot and correcting a position of the workpiece. However, WO 2009/077118 A1 does not disclose a concrete method for obtaining an accurate robot position at the moment of image capture.

Further, Japanese Patent No. 4174342 discloses a method for capturing an image of a workpiece when a robot transfers the workpiece and correcting a grasping error. However, an error of a robot position resulting from an update cycle of the robot position is not taken into consideration.

Japanese Unexamined Patent Publication No. 2008-183690 discloses a method for sending a trigger signal at the moment of image capture to a control system of a servo motor that updates robot positional information at a shorter cycle and obtaining the robot positional information possessed by the control system. Even in this case, accuracy of the robot positional information depends on a control cycle of the control system of the servo motor. Further, the method disclosed in Japanese Unexamined Patent Publication No. 2008-183690 has a problem in that this method requires dedicated trigger signal line and trigger input/output section.

The present invention has been made in view of these circumstances and it is an object of the present invention to provide a robot system that can obtain an accurate robot position at the moment of image capture without temporarily stopping the robot and without using dedicated hardware.

SUMMARY OF THE INVENTION

In order to achieve the above object, according to a first aspect, there is provided a robot system comprising: a robot; a robot controlling section for controlling the robot; and a visual sensor for visually measuring a workpiece, wherein either the workpiece or the visual sensor grasped by or fixed to an arm tip of the robot can be moved by operation of an arm of the robot and the other of the workpiece or the visual sensor is disposed at a position remote from the robot, the robot system comprising: a visual sensor information processing section that controls the visual sensor and, based on information of the workpiece measured by the visual sensor, calculates positional information of the workpiece with respect to the visual sensor; a clock to which the robot controlling section and the visual sensor information processing section access to check a present time; a robot position and time storing section that sequentially stores first times at a regular or irregular cycle in combination with positional information items of the arm tip at the first times, respectively; an image capture time storing section that stores a second time when the visual sensor captures an image of the workpiece; an arm tip position calculating section that calculates positional information of the arm tip when the visual sensor captures the image of the workpiece based on the second time stored in the image capture time storing section, at least two of the first times before and after the second time among the first times stored in the robot position and time storing section and the positional information items of the arm tip corresponding to the respective first times; and a workpiece position calculating section that calculates positional information of the grasped workpiece with respect to the arm tip or positional information of the workpiece disposed at the position remote from the robot with respect to the robot based on the positional information of the arm tip calculated by the arm tip position calculating section and the positional information of the workpiece calculated by the visual sensor information processing section.

According to a second aspect, in the first aspect, the visual sensor measures the workpiece while the arm tip of the robot is moving.

According to a third aspect, in the first or second aspect, the robot system further comprises a correcting section that corrects operation of the robot based on the positional information of the grasped workpiece with respect to the arm tip of the robot or the positional information of the workpiece disposed at the position remote from the robot with respect to the robot calculated by the workpiece position calculating section.

According to a fourth aspect, in the first aspect, one of the workpiece or the visual sensor grasped by or fixed to the arm tip of the robot can be moved by operation of an arm of the robot, the visual sensor performs stereo measurement by capturing images of the workpiece a plurality of times at points in time when the arm tip is located at positions different from each other during movement of the arm tip of the robot and, based on a result of the stereo measurement by the visual sensor, the workpiece position calculating section calculates three-dimensional position of the grasped workpiece with respect to the arm tip or three-dimensional position of the workpiece disposed at the position remote from the robot with respect to the robot.

According to a fifth aspect, in the first aspect, the robot system further comprises a laser slit projector attached to the visual sensor, wherein the visual sensor obtains a three-dimensional position of a portion illuminated by laser, a plurality of times at different positions, during movement of the arm tip of the robot and, based on the a plurality of the three-dimensional positions of a portion illuminated by laser, the workpiece position calculating section calculates a three-dimensional shape or/and a three-dimensional position of the workpiece.

These and other objects, features and advantages of the present invention will be more apparent in light of the detailed description of exemplary embodiments thereof as illustrated by the drawings.

DETAILED DESCRIPTION

Figure 1:
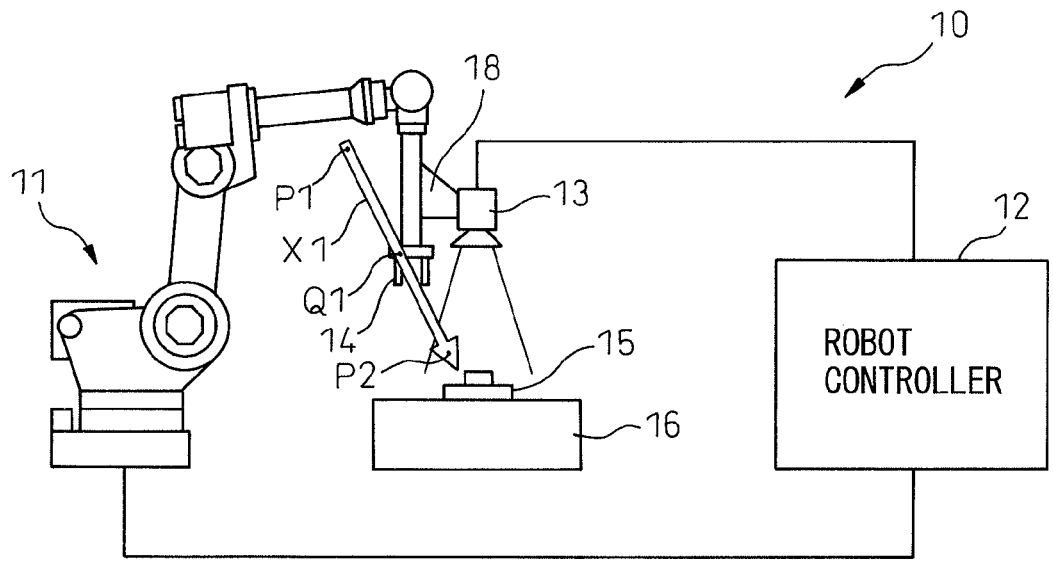
FIG. 1 is a diagram illustrating an overall configuration of a robot system in a first embodiment of the present invention.

Hereinafter, embodiments of the present invention will be described with reference to the accompanying drawings. Throughout the several views, like elements are designated by like reference numerals. For ease of understanding, the scales of these drawings are suitably changed.

FIG. 1 is a diagram illustrating an overall configuration of a robot system in a first embodiment of the present invention. Robot system 10 illustrated in FIG. 1 mainly includes a robot 11, and a robot controller 12 for controlling this robot 11. A hand 14 is mounted at an arm tip of robot 11 and this hand 14 grasps a workpiece 15 on a table 16. In this case, workpiece 15 mounted on table 16 is not positioned and a position of workpiece 15 is uncertain.

As illustrated in FIG. 1, a camera 13 is mounted at the arm tip of robot 11 via a bracket 18. The position W1 of workpiece 15 mounted on table 16 is measured by using camera 13 as a visual sensor. Based on the measured positional information of workpiece 15, robot 11 moves to a position where workpiece 15 is to be grasped.

Robot 11 is a well-known typical robot manipulator (hereinafter referred to as robot) and its mechanism is not limited to a particular one so long as it can reach a position and posture to perform an operation. Hand 14 attached to the arm tip of robot 11 is selected depending on a shape, material, weight and the like. Thus, hand 14 may be of a suction type or a chuck type. In FIG. 1, hand 14 of a chuck type is illustrated by way of example.

As indicated by arrow X1 in FIG. 1, robot 11 is programmed to move from an operation start position P1 to a workpiece grasping position P2 via an image capture position Q1 and grasp workpiece 15 at the workpiece grasping position P2. Because the position W1 of workpiece 15 is uncertain as described above, based on the position W1' of workpiece 15 determined by using camera 13, robot 11 moves to a workpiece grasping position P2' corresponding to the position W1' and grasps workpiece 15 at the workpiece grasping position P2'.

In this connection, there is a relationship between the positions W1, W1' of workpiece 15 and the workpiece grasping positions P2, P2' of robot 11 expressed by the following equation (1). The symbols representing the positions such as W1 and P1, etc., used in this patent specification are 4×4 homogeneous transformation matrices.

$$W1' \cdot W1^{-1} = P2' \cdot P2^{-1} \quad (1)$$

Robot 11 may temporarily stop at the image capture position Q1 on arrow X1. However, in the first embodiment, a case in which robot 11 moves without temporarily stopping on a path represented by arrow X1 will be described.

A program taught to robot 11 tries to capture an image at the capture position Q1. However, in the case of delay of software and the like, the image is captured at an image capture position Q1' a little deviated from the image capture position Q1. The image capture position Q1' does not have to perfectly conform to the original capture position Q1. However, in both the image capture positions Q1 and Q1', workpiece 15 has to be in a field of view of camera 13. This is because, even if the image capture position Q1 deviates to the image capture position Q1', positional information Q1' of robot 11 at the moment of image capture can be determined by using the technique described below and, based on the positional information Q1', the position W1' of workpiece 15 can be accurately determined.

It is assumed that calibration data for converting detection data determined by performing an image processing into a robot coordinate system is determined in advance by calibration in the capture position Q1 and stored in robot controller 12. Consequently, based on the image captured at the capture position Q1' and the positional information of the capture position Q1', a workpiece position calculation section 42 described below can calculate the position W1' of the workpiece in the robot coordinate system.

This calculation technique is disclosed in Japanese Patent No. 2889011 and publicly known. Consequently, a detailed description of this calculation technique is omitted. First, a predetermined image processing is performed for the image captured at the capture position Q1' to detect workpiece 15 in the image and determine its detection data. Then, based on the determined detection data and the calibration data determined in advance, a temporary position of the workpiece is determined. After that, based on the temporary position of the workpiece and an amount of movement of visual sensor 13, in other words, an amount of movement from the position Q1 at which the calibration is performed to the position Q1' at which the image is captured, the accurate position W1' of workpiece 15 is determined.

Then, the workpiece grasping position P2' at which robot 11 is to grasp the workpiece is determined according to the following equation (2).

$$P2' = W1' \cdot W1^{-1} \cdot P2 \quad (2)$$

Figure 3:
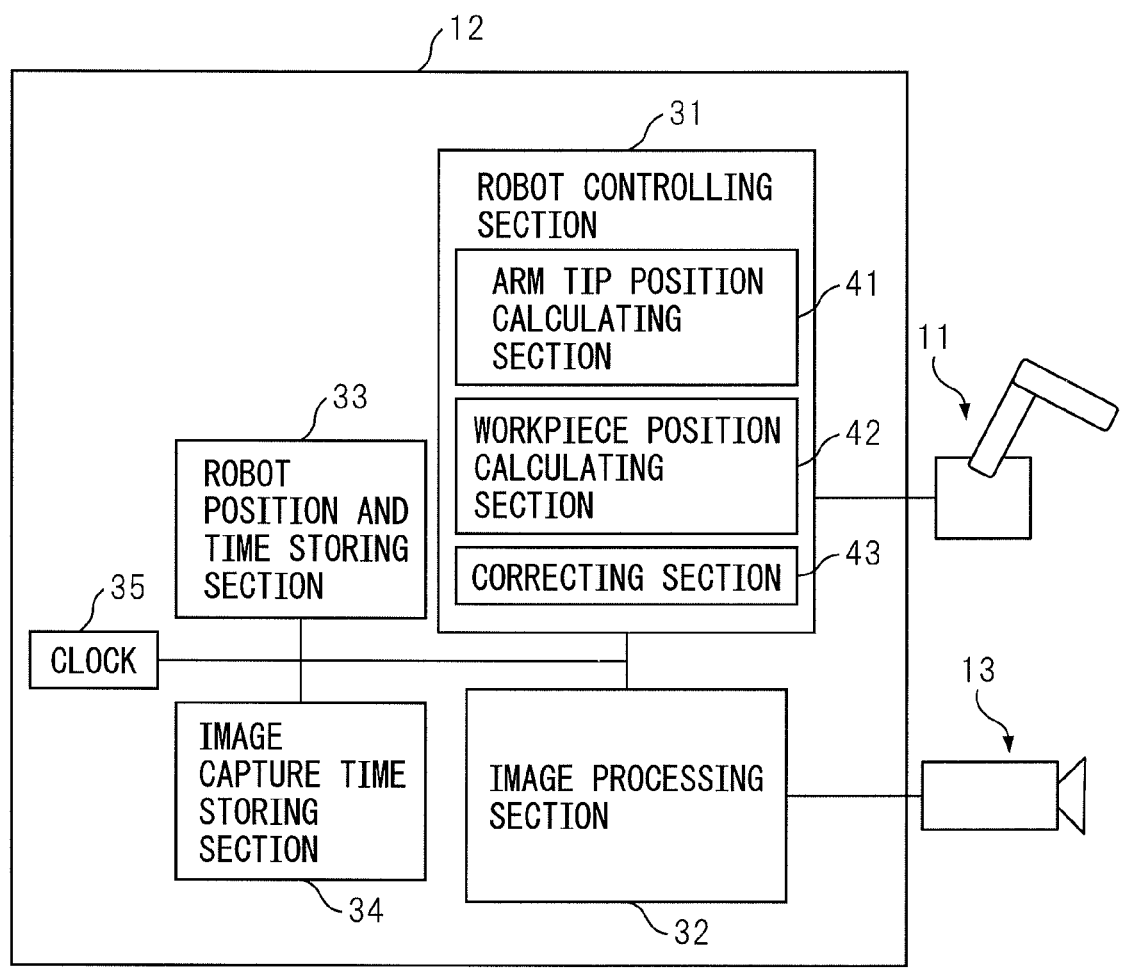
FIG. 3 is a functional block diagram of the robot system in the first embodiment.

FIG. 3 is a functional block diagram of the robot system in the first embodiment. Robot controller 12 is a digital computer that includes a robot controlling section 31, an image processing section 32, a robot position and time storing section 33, an image capture time storing section 34, and a clock 35, all of which are connected to each other via a bus. Further, as illustrated in FIG. 3, robot controlling section 31 is connected to robot 11, and image processing section 32 is connected to camera 13.

Both robot controlling section 31 and image processing section 32 can access clock 35 to obtain a time. Robot position and time storing section 33 sequentially stores, at a robot position update cycle, positions of robot 11 in combination with times obtained from clock 35 when the respective positions are obtained. Further, image capture time storing section 34 stores a time at the moment when camera 13 captures an image in combination with the image at this time. Robot position and time storing section 33 and image capture time storing section 34 may be configured to store only the latest plural sets of information or it may store all sets of information during operation of robot 11.

Further, as illustrated in FIG. 3, robot controlling section 31 includes an arm tip position calculating section 41 for calculating positional information of the arm tip when camera 13 captures the image of workpiece 15 based on at least each one time before and after the time stored in image capture time storing section 34 among the times stored in robot position and time storing section 33 and the positions of the arm tip of robot 11 corresponding to each of these times.

Still further, robot controlling section 31 includes a workpiece position calculating section 42 for calculating positional information of grasped workpiece 15 with respect to the arm tip or positional information of workpiece 15 disposed at a position remote from robot 11 with respect to robot 11 based on the positional information of the arm tip calculated by arm tip position calculating section 41 and the positional information of workpiece 15 calculated by image processing section 32.

Still further, a correcting section 43 included in robot controlling section 31 corrects the operation of robot 11 based on the positional information of grasped workpiece 15 with respect to the arm tip of robot 11 or the positional information of workpiece 15 disposed at a position remote from robot 11 with respect to robot 11 that are calculated by workpiece position calculating section 42. For this purpose, correcting section 43 can correct the program of robot 11 based on the positional information described above.

Figure 4:
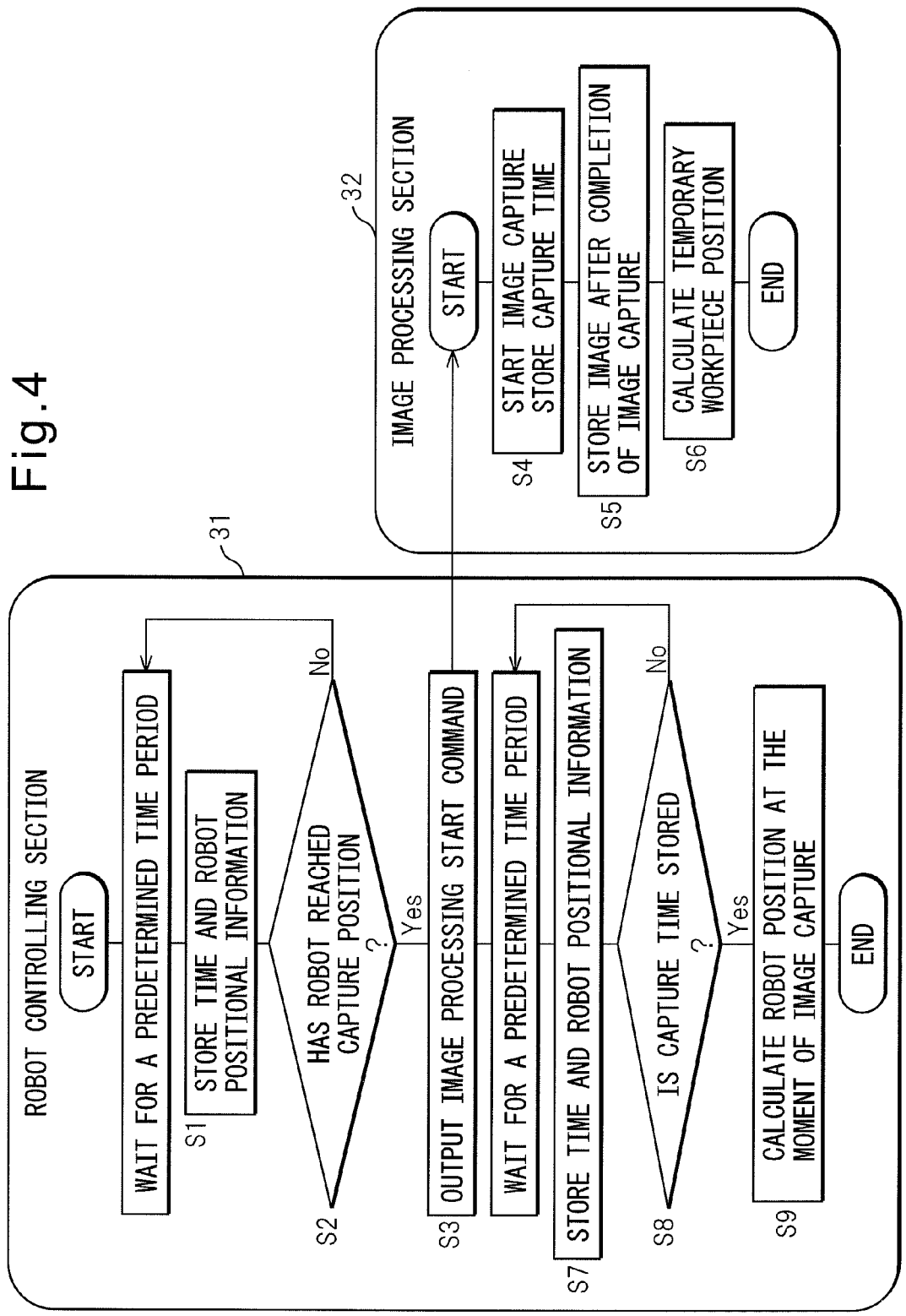
FIG. 4 is a flowchart illustrating operations of a robot controlling section and an image processing section included in the robot system of the present invention.

FIG. 4 is a flowchart illustrating operations of robot controlling section 31 and image processing section 32 included in the robot system of the present invention. Hereinafter, referring to FIGS. 3 and 4, a method for determining a position Q1' of the robot at the moment of image capture will be described.

First, in step S1, robot controlling section 31 sequentially stores, at a robot position update cycle, times obtained from clock 35 in combination with positions of the arm tip of robot 11 corresponding to the respective times in robot position and time storing section 33. The position of the arm tip of robot 11 may be simply referred to as the "robot position".

For example, when robot 11 is a 6-axis vertical articulated robot, angles (J1-J6) of axes of the robot can be stored as the robot positional information. Hereinafter, for ease of description, the stored time and robot position are assumed to be Tx and Px=(Jx1 to Jx6), respectively. The robot position update cycle may be either regular or irregular.

Then, in step S2, robot controlling section 31 checks whether robot 11 has reached a capture position Q1 written in its operation program in advance or not. If robot 11 has reached, the process proceeds to step S3. If robot 11 has not yet reached, the process waits for a predetermined time period and, then, returns to step S1 and the process is repeated till robot 11 reaches the capture position Q1.

In the embodiment illustrated in FIG. 4, whether robot 11 has reached the capture position Q1 or not is checked by monitoring the position of robot 11 by robot controlling section 31. However, whether robot 11 has reached the capture position Q1 or not may be judged by measuring in advance a required time from robot 11 starts the operation till robot 11 reaches the capture position Q1 and comparing the required time with the elapsed time after robot 11 starts the operation (that can be obtained from clock 35). Alternatively, when the required time described above has elapsed after robot 11 starts the operation, the process may automatically proceed to step S3.

Then, in step S3, robot controlling section 31 outputs an image processing start command to image processing section 32. When the image processing start command is output, image processing section 32 starts processing.

In step S4, image processing section 32 sends a capture command to camera 13 and stores a time obtained from clock 35 as a capture time Ts in image capture time storing section 34. Then, in step S5, after waiting for completion of capture of an image of workpiece 15 by camera 13, the captured image in combination with the capture time Ts already stored in step S4 is stored in image capture time storing section 34.

Then, in step S6, image processing section 32 performs a predetermined image processing for the image captured in step S5 to detect workpiece 15 imaged in the image and determines its detection data and, further, based on the determined detection data and the calibration data determined in advance, determines temporary positional information of the workpiece.

After completing step S3, robot controlling section 31 proceeds to step S7. In step S7, in the next robot position update cycle, robot controlling section 31 similarly stores a new time in combination with a new robot position in robot position and time storing section 33. For ease of description, the time and robot position stored in step S7 are assumed to be Ty and Py=(Jy1 to Jy6), respectively.

Then, in step S8, robot controlling section 31 checks whether the capture time is stored in image capture time storing section 34 or not. If the capture time is stored, the process proceeds to step S9. If the capture time is not stored yet, the process waits for a predetermined time period and, then returns to step S7 and this check process is repeated till the capture time is stored.

Then, in step S9, based on the capture time Ts stored in image capture time storing section 34 and the combination of the robot positions and the times Tx, Px and Ty, Py stored in robot position and time storing section 33, arm tip position calculating section 41 of robot controlling section 31 calculates a robot position Q1'=(Js1 to Js6) at the moment of image capture. It is to be noted that "Tx is before Ts and Ty is after Ts".

Arm tip position calculating section 41 calculates the robot position Q1' at the moment of image capture according to the following equation (3) by using, for example, linear interpolation.

$$Jsi=(Jyi-Jxi)\times(Ts-Tx)/(Ty-Yx)+Jxi \ (i=1 \text{ to } 6) \quad (3)$$

The robot position Q1' (Js1 to Js6) at the moment of image capture is position of each axes. However, by forward transformation, an orthogonal position can be determined.

In the first embodiment, the robot position Q1' at the moment of image capture is calculated by linearly interpolating the position of each axes of the robot. However, the robot position Q1' may be calculated by other techniques. For example, it may be calculated by extrapolation. Further, as described above, the position of each axes of robot 11 may be either directly interpolated or first converted into the orthogonal position and, then, interpolated. When the linear interpolation is used as in the first embodiment, two sets of the robot positions and times will suffice.

The interpolation formula to be used can be selected according to characteristics of the control system of robot 11. For example, by using a quadratic interpolation, an approximation error can be reduced even if the velocity of robot 11 varies. However, when the quadratic interpolation is used, three sets of the robot positions and times are required. In this case, two Tx's before the capture time Ts and one Ty after the capture time Ts may be used, or one Tx before the capture time Ts and two Ty's after the capture time Ts may be used.

After that, as described above, based on the positional information of the arm tip calculated by arm tip position calculating section 41 and the temporary positional information of workpiece 15 calculated by image processing section 32 as described above, workpiece position calculating section 42 calculates the positional information of workpiece 15 disposed at a position remote from robot 11 with respect to robot 11.

Figure 2:
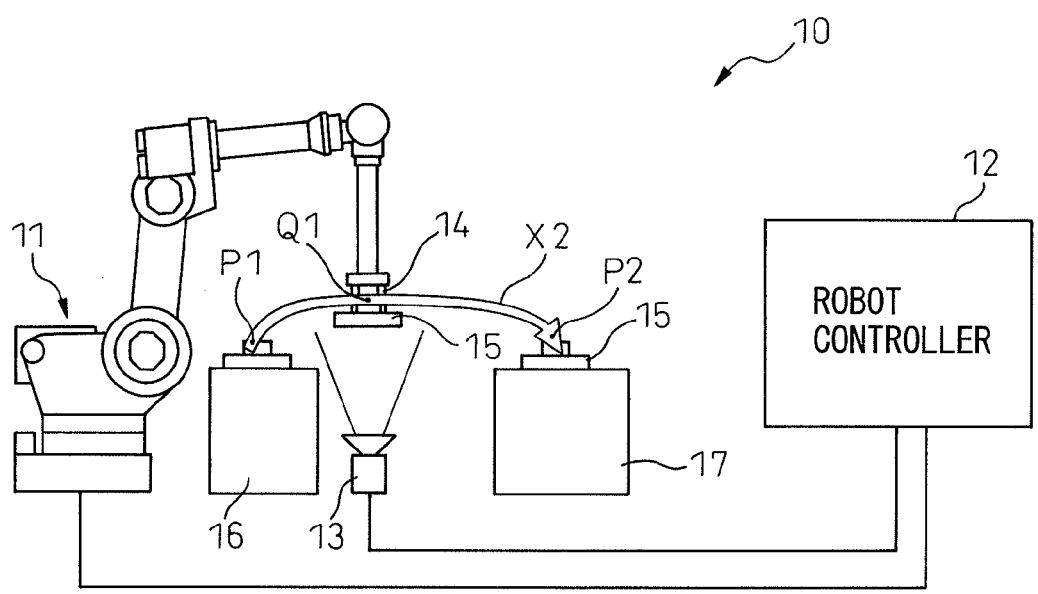
FIG. 2 is a diagram illustrating an overall configuration of a robot system in a second embodiment of the present invention.

FIG. 2 is a diagram illustrating an overall configuration of a robot system in a second embodiment of the present invention. In FIG. 2, camera 13 is fixed at a predetermined position between two tables 16 and 17. In other words, camera 13 is disposed at a position far remote from robot 11. In the second embodiment, robot 11 transfers workpiece 15 from one table 16 to the other table 17.

Because the position of workpiece 15 on table 16 is uncertain as described above, robot 11 may grasp workpiece 15 with a deviation. In the second embodiment, camera 13 is used for measuring the amount of the grasping deviation while workpiece 15 is being transferred.

As indicated by arrow X2 in FIG. 2, robot 11 is programmed to grasp workpiece 15 at an operation start position P1 on table 16 and move to a position P2 on table 17 via an image capture position Q1 and put workpiece 15 on table 17. As described above, a program taught to robot 11 tries to capture an image at the capture position Q1. However, in the case of delay of software and the like, the image is captured at an image capture position Q1' a little deviated from the image capture position Q1.

In the second embodiment, in order to correct the grasping deviation of workpiece 15 by hand 14, a relative position of workpiece 15 with respect to an arm tip of robot 11 is measured. Assuming that a position of workpiece 15 in a world coordinate system measured when robot 11 is located in the position Q1' is W1', workpiece position calculating section 42 calculates the relative position V1' of workpiece 15 with respect to the arm tip of robot 11 according to the following equation (4).

$$V1'=Q1'^{-1}\cdot W1' \quad (4)$$

Then, with regard to workpiece 15 grasped when the position P2 is taught, assuming that the relative position of workpiece 15 with respect to the arm tip of robot 11 is V1, workpiece position calculating section 42 calculates a position P2' at which workpiece 15 imaged at the position Q1' is to be released according to the following equation (5).

$$P2'=P2\cdot V1\cdot V1'^{-1} \quad (5)$$

In the embodiments described above, one two-dimensional camera 13 is used as the visual sensor. However, a three-dimensional position and posture of workpiece 15 may be determined by using a three-dimensional sensor. The three-dimensional sensor or a camera constituting the three-dimensional sensor may be either a color camera or a monochrome camera. Hereinafter, embodiments in which the three-dimensional sensor is used as the visual sensor will be described.

Figure 5:
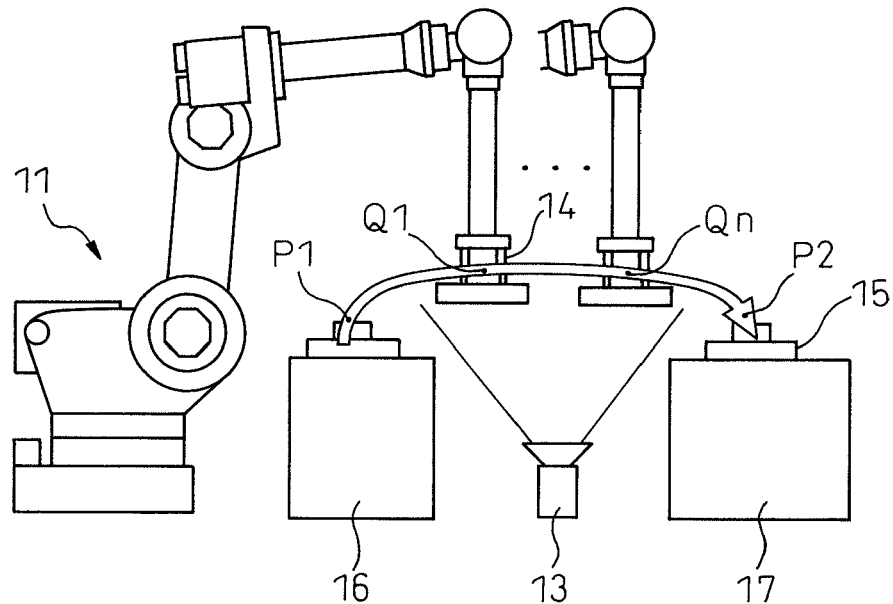
FIG. 5 is a diagram illustrating an overall configuration of a robot system in an embodiment performing stereo measurement.

In one embodiment, a three-dimensional visual sensor of a stereo system using single or a plurality of cameras 13 can be used. FIG. 5 is a diagram illustrating an overall configuration of a robot system in an embodiment in which stereo measurement is performed. When the technique for determining the robot position at the moment of image capture during operation of robot 11 is used, as illustrated in FIG. 5, the stereo measurement may be performed based on a plurality of images of workpiece 15 captured from different positions (Q1, . . . , Qn) obtained by successively imaging workpiece 15 during operation of robot 11 by using single camera 13. When the measurement as illustrated in FIG. 5 is performed, a three-dimensional position of grasped workpiece 15 with respect to the arm tip of robot 11 can be determined. Further, though not illustrated, in the configuration illustrated in FIG. 1, by performing the stereo measurement based on a plurality of images of workpiece 15 captured from different positions (Q1, . . . , Qn), a three-dimensional position of workpiece 15 with respect to robot 11 can be determined.

Figure 6:
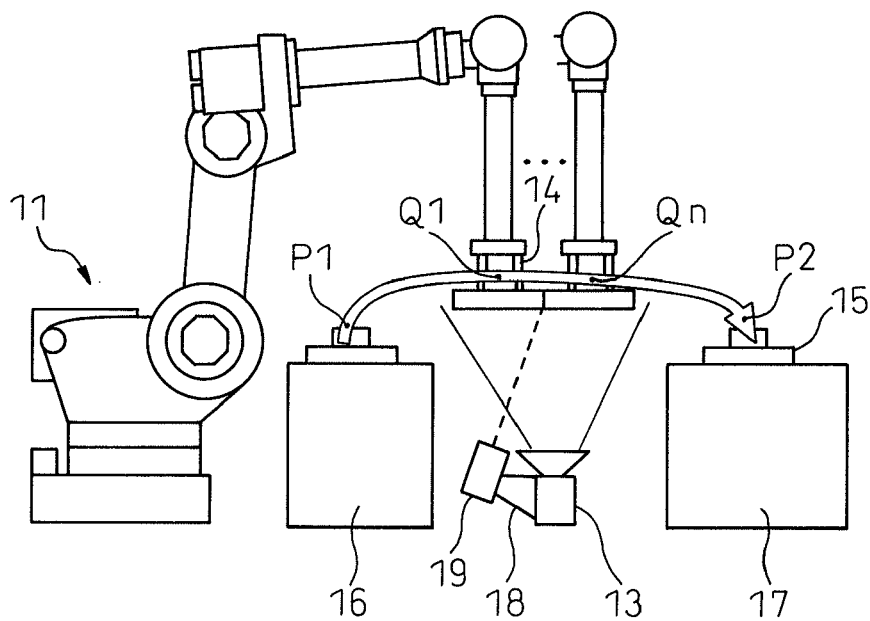
FIG. 6 is a diagram illustrating an overall configuration of a robot system in an embodiment comprising a laser slit projector.

FIG. 6 is a diagram illustrating an overall configuration of a robot system in an embodiment comprising a laser slit projector. In FIG. 6, a three-dimensional visual sensor that is comprised of camera 13 and a laser slit projector 19 attached to camera 13 via an arm 18 is used. This three-dimensional visual sensor can measure a three-dimensional position of points illuminated by laser and it can also measure a position and posture of the workpiece of a geometrically defined shape. The three-dimensional visual sensor described above is well known and therefore not discussed in detail. In order to perform the measurement by using this sensor, both typical camera images and laser images have to be obtained. Further, when a plurality of images are obtained during operation of the robot, robot positions at which the images are captured are different from each other and, as a result, these robot positions have to be taken into consideration to perform calculation.

Three-dimensional positions of points illuminated by laser may be successively determined and a plurality of obtained three-dimensional positional information may be integrated into a so-called depth map and, based on the depth map, a three-dimensional shape of workpiece 15 may be obtained. Also in this case, by using the technique described above, the three-dimensional positional information is calculated by using the robot position at the moment when the image of the point illuminated by laser is captured. From the three-dimensional shape of workpiece 15 thus obtained, a three-dimensional position and posture of workpiece 15 can be determined.

Figure 7:
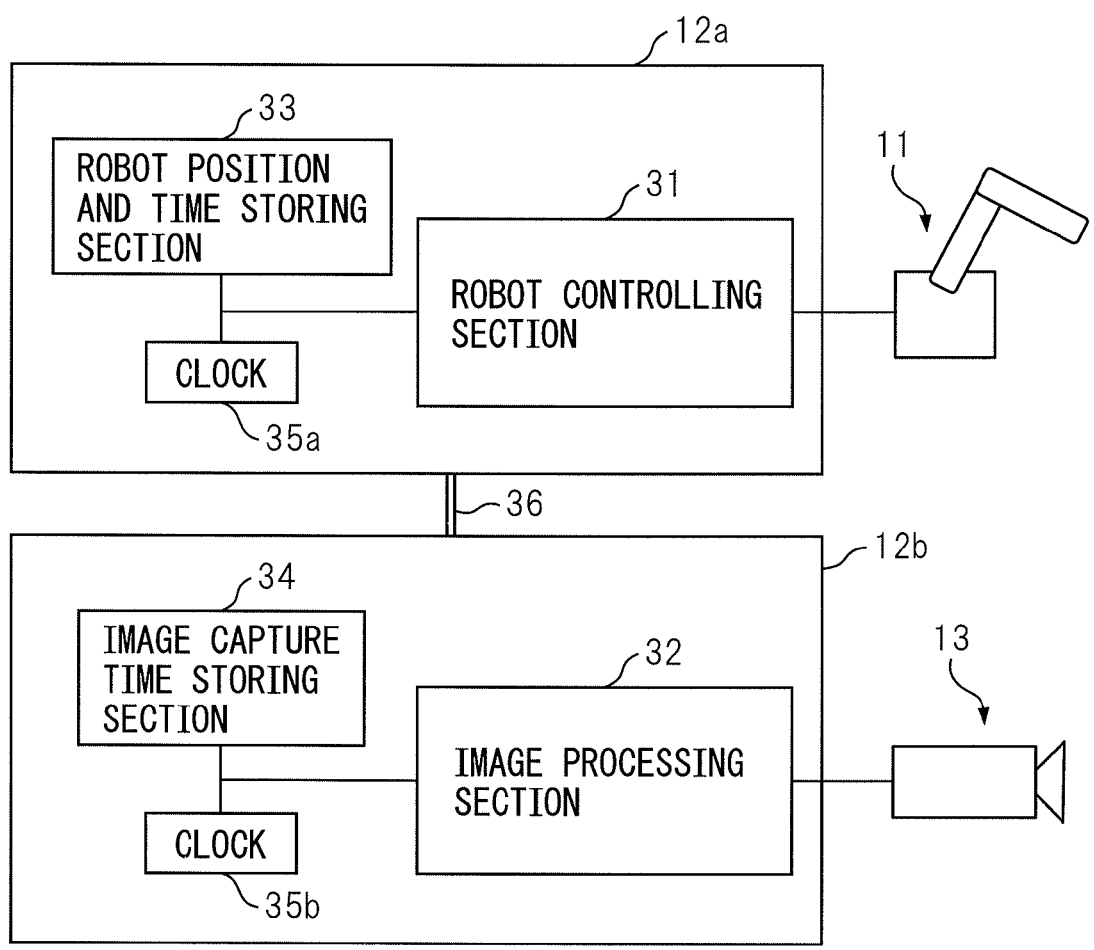
FIG. 7 is a functional block diagram of a robot system in another embodiment.

FIG. 7 is a functional block diagram of a robot system in another embodiment. In FIG. 7, a robot controller 12a connected to robot 11 and an image processor 12b connected to camera 13 (visual sensor) are mainly illustrated. As illustrated in FIG. 7, robot controller 12a includes robot controlling section 31, robot position and time storing section 33 and clock 35a that are connected to each other.

Similarly, an image processor 12b includes image processing section 32, image capture time storing section 34 and clock 35b that are connected to each other. It is to be noted that these clocks 35a and 35b are synchronized with each other. Consequently, the times that are independently obtained by robot controller 12a and image processor 12b from clocks 35a and 35b, respectively, are equal to each other.

As illustrated in the figure, robot controller 12a and image processor 12b are connected to each other via a communication interface 36 such as, for example, a wired LAN or a wireless LAN. In this connection, a delay may occur in a process of communication interface 36. However, because image capture time storing section 34 can store the image in association with the time, two or more times near the time stored in image capture time storing section 34 can be retrieved from robot position and time storing section 33 and, based on these times, a necessary robot position can be determined.

Figure 8:
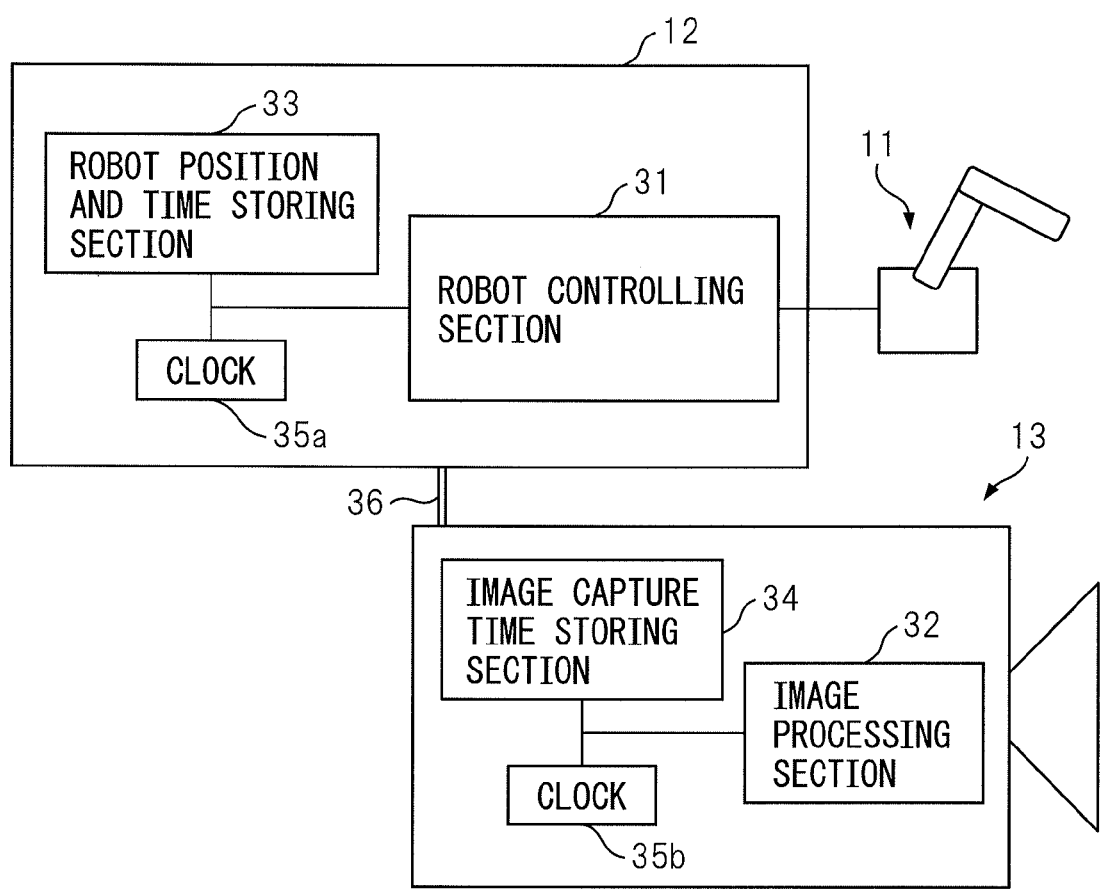
FIG. 8 is a functional block diagram of a robot system in yet another embodiment.

FIG. 8 is a functional block diagram of a robot system in yet another embodiment. In FIG. 8, robot controller 12 connected to robot 11 and camera 13 including image processing section 32 are mainly illustrated. As illustrated in FIG. 8, robot controller 12 includes robot controlling section 31, robot position and time storing section 33 and clock 35a that are connected to each other.

Camera 13 includes image processing section 32, image capture time storing section 34 and clock 35b that are connected to each other. Similarly to the immediately preceding embodiment, clocks 35a and 35b are synchronized with each other, and robot controller 12 and camera 13 are connected to each other via communication interface 36. Also in the embodiments illustrated in FIGS. 5-8, it is apparent that effects similar to those described above can be obtained.

EFFECTS OF THE INVENTION

Thus, in the first aspect, the position of the workpiece is calculated by using the positions of the arm tip at the times before and after the capture time. Consequently, with an accuracy higher than that of the positional information of the arm tip recognized at a regular or irregular cycle, the positional information of the robot at the moment when the visual sensor captures the image can be obtained and, as a result, the position of the workpiece can be calculated with an accuracy higher than that of the conventional art. This is particularly advantageous when the robot is operating as in the second aspect.

Further, even when the robot stops moving, the robot controller controls servo motors and, therefore, the position and posture of the arm tip of the robot slightly changes. For this reason, also when the visual sensor captures the images of the workpiece while the robot stops moving, the positional information of the robot can be obtained more accurately than in the conventional technique and accuracy of measurement of the position of the workpiece by the visual sensor can be improved.

Still further, in the first aspect, the robot positional information at the moment of image capture can be obtained without using a dedicated trigger signal line or trigger input/output section. Thus, the cost for adding the dedicated trigger signal line or trigger input/output section can be eliminated and failure risk of these elements can be reduced. Further, the user is provided with a system that is convenient to use.

Thus, in the third aspect, the robot can be moved to a more appropriate target position according to the position of the workpiece recognized by the visual sensor.

Thus, in the fourth aspect, due to the stereo measurement, the three-dimensional position of the workpiece grasped by the robot with respect to the arm tip of such robot or the three-dimensional position of the workpiece disposed at a position remote from the robot with respect to such robot can be determined more accurately.

Thus, in the fifth aspect, the three-dimensional shape or/and the three-dimensional position of the workpiece can be determined more accurately by using the depth map.

Although the invention has been shown and described with exemplary embodiments thereof, it should be understood by those skilled in the art that the foregoing and various other changes, omissions and additions may be made therein and thereto without departing from the spirit and the scope of the invention.

The invention claimed is:

1. A robot system comprising: a robot; a robot controlling section for controlling said robot; and a visual sensor for visually measuring a workpiece, wherein one of said workpiece or said visual sensor grasped by or fixed to an arm tip of said robot can be moved by operation of an arm of said robot and the other of said workpiece or said visual sensor is disposed at a position remote from said robot, said visual sensor measures said workpiece while said arm tip of the robot is moving, wherein calibration data for converting a result of an image processing into a robot coordinate system is determined in advance in relation to said visual sensor; the robot system comprising:

an image processing section that controls said visual sensor and, based on information of the image of said workpiece measured by said visual sensor, calculates positional information of said workpiece on the image;

a clock to which said robot controlling section and said image processing section access to check a present time;

a robot position and time storing section that sequentially stores first times at a regular or irregular cycle in combination with positional information items of said arm tip at said first times, respectively;

an image capture time storing section that stores a second time, which is different from the first times, when said visual sensor captures an image of said workpiece;

an arm tip position calculating section that calculates positional information of said arm tip at the second time when said visual sensor captures said image of said workpiece based on said second time stored in said image capture time storing section, at least two of the first times before and after said second time among the first times stored in said robot position and time storing section and the positional information items of said arm tip corresponding to the respective first times; and a workpiece position calculating section that calculates positional information of said grasped workpiece with respect to said arm tip or positional information of said workpiece disposed at the position remote from said robot with respect to said robot based on the calibration data, the positional information of said arm tip at the second time calculated by said arm tip position calculating section and the positional information of said workpiece on the image at the second time calculated by said image processing section.

2. A robot system according to claim 1, further comprising a correcting section that corrects operation of said robot based on the positional information of said grasped workpiece with respect to said arm tip of said robot or the positional information of said workpiece disposed at the position remote from said robot with respect to said robot calculated by said workpiece position calculating section.

3. A robot system according to claim 1, wherein one of said workpiece or said visual sensor grasped by or fixed to the arm tip of said robot can be moved by operation of an arm of said robot, said visual sensor performs stereo measurement by capturing images of said workpiece a plurality of times at points in time when said arm tip is located at positions different from each other during movement of said arm tip of said robot and, based on a result of said stereo measurement by said visual sensor, said workpiece position calculating section calculates a three-dimensional position of said grasped workpiece with respect to said arm tip or a three-dimensional position of said workpiece disposed at the position remote from said robot with respect to said robot.

4. A robot system according to claim 1, further comprising a laser slit projector attached to said visual sensor, wherein said visual sensor obtains a three-dimensional position of a portion illuminated by laser, a plurality of times at different positions, during movement of said arm tip of said robot and, based on a plurality of said three-dimensional positions of portions illuminated by laser, said workpiece position calculating section calculates a three-dimensional shape or/and a three-dimensional position of the workpiece.

* * * * *